Figure 1:
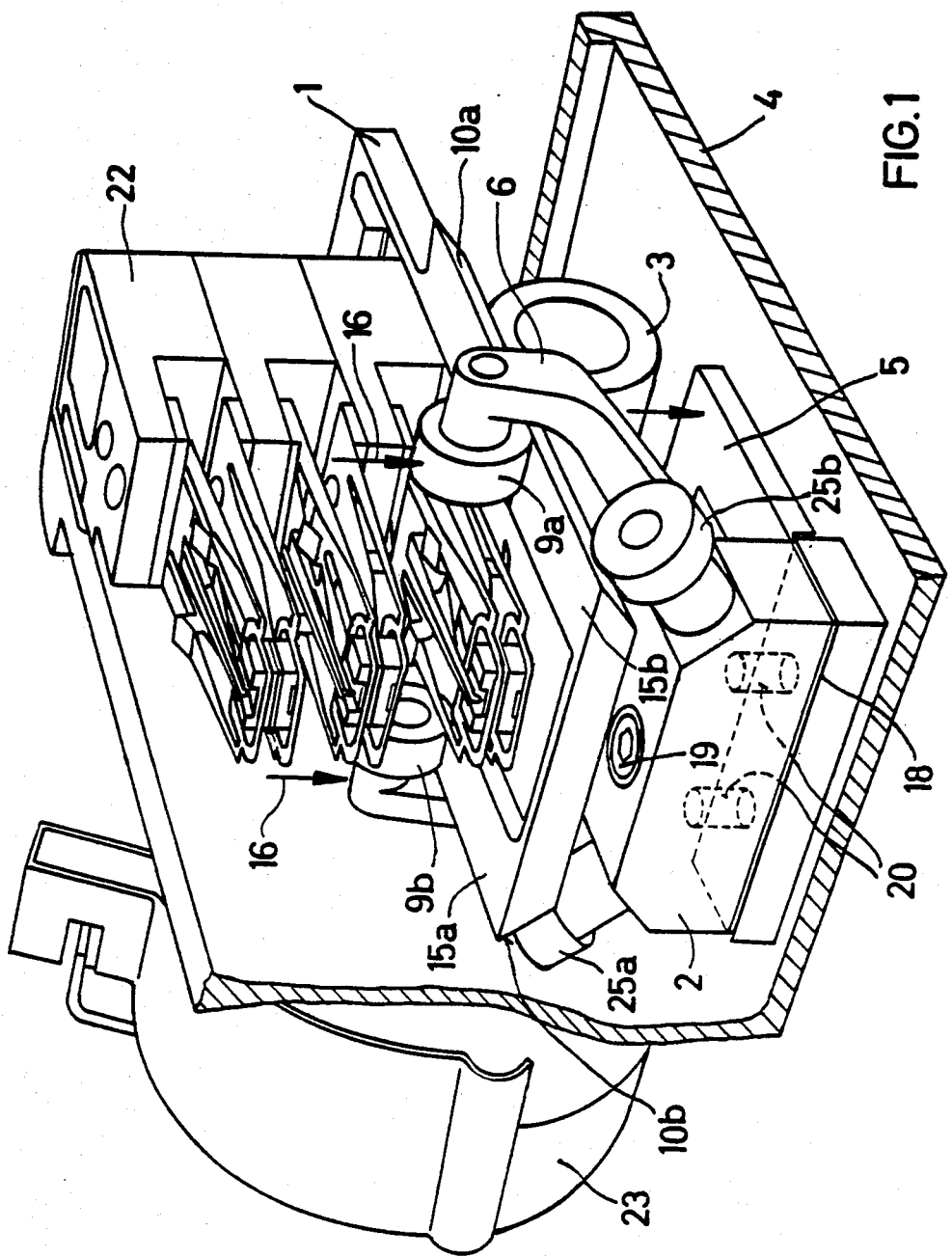

United States Patent [19]

Grittmann et al.

[11] Patent Number: 4,527,211

[45] Date of Patent: Jul. 2, 1985

[54] DEVICE FOR POSITIONING A SCANNING HEAD IN A DRIVE UNIT FOR DISK RECORDS

[75] Inventors: Ernst-Juergen Grittmann, Ludwigshafen; Hans-Joachim Weis, Mannheim; Klaus Manzke, Westheim, all of Fed. Rep. of Germany

[73] Assignee: BASF Aktiengesellschaft, Fed. Rep. of Germany

[21] Appl. No.: 598,997

[22] Filed: Apr. 11, 1984

[30] Foreign Application Priority Data

Apr. 14, 1983 [DE] Fed. Rep. of Germany ... 8311053[U]

[51] Int. Cl.$^3$ .................... G11B 5/56; G11B 5/54; G11B 5/55; G11B 21/24
[52] U.S. Cl. .................................. 360/109; 360/97; 360/105; 360/106
[58] Field of Search .................... 360/97, 98, 95, 105, 360/106, 77, 78, 79, 109, 104, 107, 108; 346/137

[56] References Cited

U.S. PATENT DOCUMENTS

| 4,161,004 | 7/1979 | Dalziel | 360/106 |
| 4,163,996 | 8/1979 | Kaseta | 360/97 |
| 4,164,769 | 8/1979 | Kaseta | 360/106 |
| 4,185,309 | 1/1980 | Feldstein | 360/109 |

Primary Examiner—Robert M. Kilgore
Attorney, Agent, or Firm—Keil & Weinkauf

[57] ABSTRACT

A head positioning device for a disk drive unit comprises a Y-shaped drive band for displacing the carriage bearing the head(s), each divergent arm portion of the Y forming the same angle with the central longitudinal axis of the band. In another embodiment, the two divergent arm portions are connected together by a crosspiece. Advantageously, the drive band is made of steel having a tensile strength of from 1200 to 2500 N/mm$^2$, especially from 2000 to 2500 N/mm$^2$. The novel positioning device can be used with advantage in any type of system for recording, reproducing and storing audio, video, data or control signals.

8 Claims, 4 Drawing Figures

DEVICE FOR POSITIONING A SCANNING HEAD IN A DRIVE UNIT FOR DISK RECORDS

The present invention relates to a device for positioning at least one scanning head in a drive unit for disk records, especially for positioning at least one magnetic head in a drive unit for rigid or flexible magnetic disks, wherein the scanning head is mounted on a carriage, and a drive band having essentially the shape of a two-pronged fork is provided which is wound around a cylindrical member that can be rotated by a drive motor, and is fastened at either end to the carriage, the narrow end portion running between the two prong-like end portions, so that, when the cylindrical member is rotated, the end portions are wound onto and off said member, thereby causing the carriage, bearing the scanning head, to move in the longitudinal direction, radially with respect to the disk record.

A positioning device of this type can be used advantageously in any signal-storage system in which the signals are recorded at a high track density by, for example, magnetic, electrical or optical means.

U.S. Pat. No. 4,161,004 discloses a head positioning mechanism in which a non-extensible band is wound round a capstan and is fastened thereto, the opposite ends of the band being attached to spaced-apart locations on the carriage member. One half of the band is provided with a rectangular slot, and the other half consists of an elongated tongue, the width of which is just slightly less than that of the slot, the tongue being doubled back through the slot to form a loop through which the capstan is inserted.

In practise, with this prior art positioning mechanism the range of travel of the carriage is very limited because the angle through which the capstan can be rotated is restricted by the shape of the flexible band and the means used to secure the band to the capstan, the angle of rotation being from about 180° to 300°. Owing to the presence of the central web, where the band is fastened to the capstan, the angle of rotation of the capstan is the same in the clockwise and the counterclockwise direction, i.e. further winding and unwinding of the band is effectively prevented. For field operation it has proved necessary to hold the central web down with an additional clamping member to prevent the band from being deformed or lifting away from the peripheral surface of the capstan when tension is applied to the band.

A further head positioning device for a magnetic disk drive is known which comprises a flexible band that allows the capstan to rotate through a larger angle than that indicated above and thus enables the range of travel of the carriage to be increased. This band is essentially Z-shaped, the opposite end portions being fastened to the carriage, and the central portion, which is wrapped spirally around the capstan and fastened thereto at one point, being at an angle of about 20° to the central longitudinal axis of the Z. A disadvantage of the Z shape is that, when the band is wound around the capstan under tension, it exerts a torque thereon, which makes it very difficult to position the capstan at right angles to the carriage. Moreover, the torque exerted on the capstan when it rotates in one direction differs from that when it rotates in the other direction, which results in positioning hysteresis and makes expensive guide means for the carriage necessary. In the case of this prior art band, strain and deformation occur when it is secured to the carriage under tension, which results in premature failure or breakage.

An object of the present is to provide a positioning device of the type described at the outset which is highly durable and enables the carriage to be displaced over a large range, and in which the forces applied to the rotatable cylindrical member by the drive band act symmetrically thereon.

We have found that this object is achieved with a device for positioning at least one scanning head in a drive unit for disk records, particularly for positioning at least one magnetic head in a drive unit for rigid or flexible magnetic disks, in which the scanning head is mounted on a carriage, and a flexible drive band having essentially the shape of a two-pronged fork is wound around a cylindrical member that can be rotated by a drive motor, and is fastened at either end to the carriage, the narrow end portion running between the two prong-like end positions, so that, when the cylindrical member is rotated, the end portions are wound onto and off said member, thereby causing the carriage, bearing the scanning head, to move in the longitudinal direction, radially with respect to the disk record, wherein the flexible drive band is essentially Y-shaped, each divergent arm portion of the Y forming the same angle with the central longitudinal axis of the band, and having essentially the same width.

As a result of this design, an angle of rotation of up to 340° can be attained if the band is fastened to the cylindrical member, and an angle of more than 340° and, if necessary, of more than 360° can be obtained if it is not fastened thereto. Moreover, the forces applied to the cylindrical member by the band of the present invention act symmetrically thereon when it is fitted and when the said member is stationary or rotating (during positioning), which makes it easier to position the cylindrical member at right angles to the carriage, and reduces positioning hysteresis to a minimum. In addition, the novel design ensures that the band is uniformly stressed and hence has a long life.

The flexible, non-stretchable band of the invention has a tensile strength of from about 1200 to about $2500 N/mm^2$, advantageously from about 2000 to about $2500 N/mm^2$.

Figure 2:
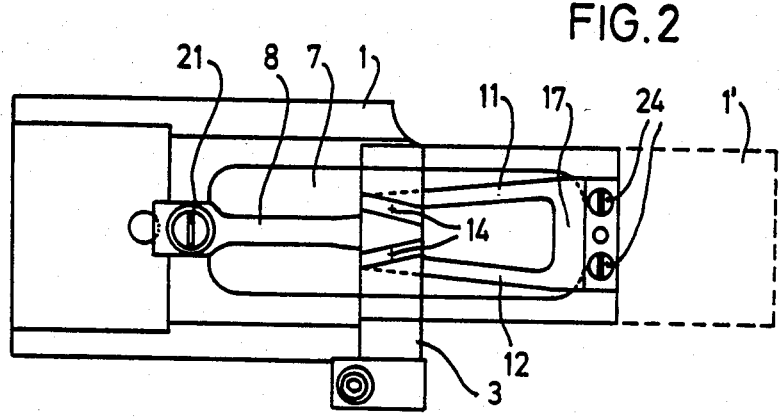

Further details of the invention are disclosed in the following embodiments given by way of example and illustrated in the accompanying drawings, in which FIG. 1 is a schematic perspective view of a positioning device according to the invention for a plurality of magnetic heads, with the chassis of the disk drive unit in section, FIG. 2 is a bottom plan view of the carriage of FIG. 1, which bears the magnetic heads, together with a cylindrical member and a novel flexible band wound therearound.

Figure 3:
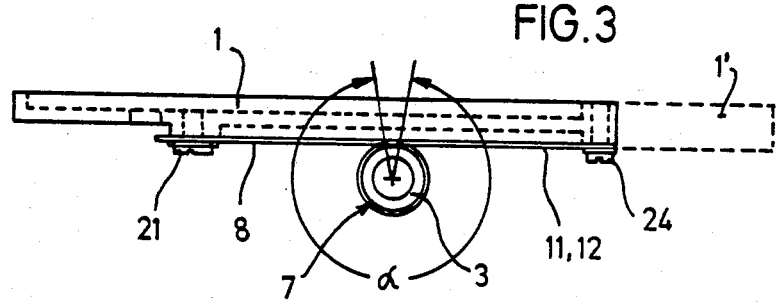
Figure 4:
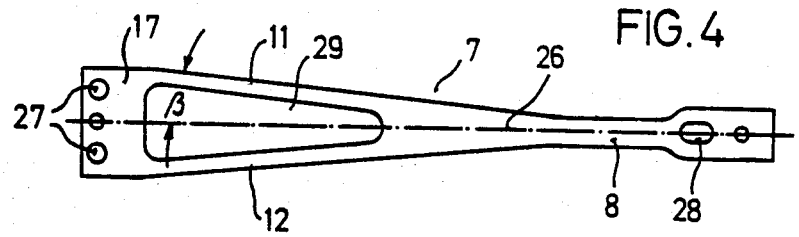

FIG. 3 is a side elevation of the assembly shown in FIG. 2, partly in section, and FIG. 4 is a plan view of the novel flexible band in the unwound state.

Referring first to FIGS. 1 to 3, a motor 23, which is fastened to the chassis 4 of the disk drive unit, carries on its shaft a cylindrical member 3 around which a drive band 7 is wound, the two ends of this band being securely attached to the carriage 1 bearing the magnetic head assembly 22. No spring means of any kind is required for tensioning the drive band, which is inextensible in the longitudinal direction, because the presence thereof would make positioning less accurate. The carriage 1 is supported, at one end, on the periphery of the cylindrical member 3 and, at the other end, by means of anti-friction bearings 25a, 25b on a bearing carrier 2 which, in its turn, is rigidly attached to the chassis 4.

A bow-shaped member 6 is arranged centrally between the cylindrical member 3 and the bearing carrier 2, and presses, via anti-friction bearings 9a, 9b, on the upper guide surfaces 15a, 15b of the carriage 1. The forces applied to either side of the carriage 1, in the direction 16, are produced by means of a prestressed flexure member 5, via which the bow-shaped member 6 is attached to the chassis 4. Moreover, the bow-shaped member 6 is gimbal-mounted on flexure member 5, so that it can pivot relative to the horizontal plane in which carriage 1 is displaced. Bearing carrier 2, flexure member 5 and bow-shaped member 6 can be positioned on and jointly fastened to the mounting surface 18 of the chassis 4 by means of only one screw 19 and two locking pegs 20.

The lateral guide surfaces 10a and 10b of the carriage 1, which are preferably inclined, are supported on anti-friction bearings 25a and 25b on bearing carrier 2, and the position of the carriage 1 in the chassis 4 is determined by this bearing arrangement.

The arrangement of the above-described pairs of anti-friction bearings, which can in practise be ball bearings, can also, in principle, be reversed, with the fixed bearings on top, and the gimbal-mounted bearings underneath, or the order in which the guide elements are arranged in the direction in which the carriage moves can be reversed.

Due to the manner in which the anti-friction bearings 9a, 9b, 25a, 25b are arranged relative to the guide surfaces 15a, 15b, 10a, 10b, linear contact between the bearings and the carriage is achieved, as a result of which a considerable reduction in the contact pressure and hence a low-wear guide system are obtained.

FIG. 2 shows the carriage 1 together with cylindrical member 3 and drive band 7, from below. The narrow tongue-like end portion 8 of the band is fastened to the carriage 1 by means of a screw 21, and the opposite divergent arm portions 11 and 12, which are shown here connected together by a crosspiece 17, and are essentially of the same width, are fastened to the carriage by two screws 24. As is readily apparent, end portion 8 and arm portions 11 and 12 are continuously wound onto and unwound from the cylindrical member 3 during head positioning; end portion 8 wraps itself around the cylindrical member at right angles to the axis of said member, and each arm portion 11, 12 wraps itself around said member in a spiral whose pitch is somewhat larger than the width of the arm portion. To ensure that the turns lie next to each other, the angles formed between the arm portions 11 and 12 and the central longitudinal axis of the band 7 are the same, e.g. $\beta$=about 6°, the angle being determined by the diameter of the cylindrical member 3, the desired range of carriage travel, and the width of the arm portions 11 and 12.

As can be seen from FIG. 2, the band 7 is attached to the peripheral surface of th cylindrical member 3 at two points 14, advantageously by welding, for example laser beam welding, which limits the utilizable angle of rotation (angle $\alpha$ in FIG. 3) to 340°. If the band is not fastened to the peripheral surface, the angle of rotation ($\alpha$) of the cylindrical member 3 is determined solely by the lengths of end portion 8 and arm portions 11 and 12. Crosspiece 17 can, if desired, be omitted without the function of the drive band 7 being adversely affected.

FIG. 3 is a side elevation, partly in section, of the assembly shown in FIG. 2, comprising carriage 1, drive band 7 and cylindrical member 3. The rearmost position of the carriage is shown in dashed lines and marked 1' in FIGS. 2 and 3.

FIG. 4 is a plan view of the band 7 in the unwound state. The ends of the band are provided with holes 27 and 28 for the fastening screws 24 and 21 respectively. The width of the narrowest section of end portion 8 is at least equal to the sum of the widths of arm portions 11 and 12. No deformation of the band occurs when it is wound around the cylindrical member 3 and placed under tension.

Suitable materials of construction for the drive band 7 are rustless spring steels and other materials having a tensile strength of from about 1200 to about 2500N/mm$^2$, particularly from about 2000 to about 2500N/mm$^2$. Stainless spring steels and materials which, in addition to having the said tensile strength, have a very low elongation, advantageously less than 5%, are particularly suitable. A chromium-nickel steel alloy having a tensile strength of about 2200N/mm$^2$ and an elongation of 2% fulfils field requirements optimally.

The following results were obtained with a positioning device according to the invention:
(1) Mean positioning time: 1.2 msec.
(2) Hysteresis: 2–3 $\mu$m.

In the case of (1), a magnetic disk with a track spacing of 50 $\mu$m and a track width of 30 $\mu$m was used.

In the case of (2), the hysteresis pertaining to movements of the carriage backwards and forwards between two predetermined points was determined by position-comparators forming part of an optical measuring apparatus. The measured value is the maximum positional discrepancy occurring during a number of positioning operations between the said two points.

It has been found to be advantageous to provide the essentially triangular slot in the band with gently rounded corners and not pointed ones, so as not to reduce the tensile strength of the drive band.

To sum up, big improvements are achieved with the positioning device according to the present invention, for example the track density is increased, the energy requirement is halved, and both the access time and the positioning errors are halved. Surprisingly, the drive band of the present invention has, as a result of its novel design, a considerably longer life than prior art bands: 35 $\mu$m thick bands made from the above alloy have successfully completed tests lasting 1100 hours, corresponding to 8.10$^6$ cycles of load stressing.

While the invention has been particularly shown and described with reference to the foregoing embodiments, it will be understood by those skilled in the art that any similar application of the device according to the invention, where the speed and accuracy of a positioning mechanism are important, and where continuously repeated, identical or similar positioning operations have to be carried out, or any alterations or modifications that may become apparent to the skilled artisan are also intended to be covered by the appended claims.

Accordingly, the novel device can be used in any type of positioning system and especially in any type of system for recording, reproducing and storing any kind of signal, for example video signals, data signals, audio signals and control signals.

We claim:

1. A device for positioning at least one scanning head in a drive unit for disk records, particularly for positioning at least one magnetic head in a drive unit for rigid or flexible magnetic disks, in which the scanning head is mounted on a carriage, and a flexible drive band having essentially the shape of a two-pronged fork is wound around a cylindrical member that can be rotated by a drive motor, and is fastened at either end to the carriage, the narrow end portion running between the two prong-like end portions, so that, when the cylindrical member is rotated, the end portions are wound onto and off said member, thereby causing the carriage, bearing the scanning head, to move in the longitudinal direction, radially with respect to the disk record, wherein the flexible drive band is essentially Y-shaped, each divergent arm portion of the Y forming the same angle with the central longitudinal axis of the band, and having essentially the same width.

2. A head positioning device as claimed in claim 1, wherein the two divergent arm portions are connected together.

3. A head positioning device as claimed in claim 1, wherein the two divergent arm portions are connected together by a crosspiece, and the slot defined by the said arm portions and the crosspiece has rounded corners.

4. A head positioning device as claimed in claim 1, wherein each of the divergent arm portions is attached to the cylindrical drive member at one point.

5. A head positioning device as claimed in claim 1, wherein the drive band is made of steel having a tensile strength of about $1200N/mm^2$ to about $2500N/mm^2$.

6. A head positioning device as claimed in claim 1, wherein the drive band is made of steel having a tensile strength of more than $2000N/mm^2$.

7. A head positioning device as claimed in claim 1, wherein the drive band is made from a chromium-nickel steel alloy.

8. A device for positioning at least one scanning head in a drive unit for disk records, particularly for positioning at least one magnetic head in a drive unit for rigid or flexible magnetic disks, in which the scanning head is mounted on a carriage, and a flexible drive band having essentially the shape of a two-pronged fork is wound around a cylindrical member that can be rotated by a drive motor, and is fastened at either end to the carriage, the narrow end portion running between the two prong-like end portions, so that, when the cylindrical member is rotated, the end portions are wound onto and off said member, thereby causing the carriage, bearing the scanning head, to move in the longitudinal direction, radially with respect to the disk record, wherein the flexible drive band is essentially Y-shaped, each divergent arm portion of the Y forming the same angle with the central longitudinal axis of the band, and having essentially the same width, which divergent arm portions are connected together, and the tensile strength of the said drive band is from about $1200N/mm^2$ to about $2500N/mm^2$.

* * * * *